Nov. 15, 1927.
F. L. MORSE
1,648,911
CHAIN ADJUSTING DEVICE
Filed Sept. 5, 1924  2 Sheets-Sheet 1
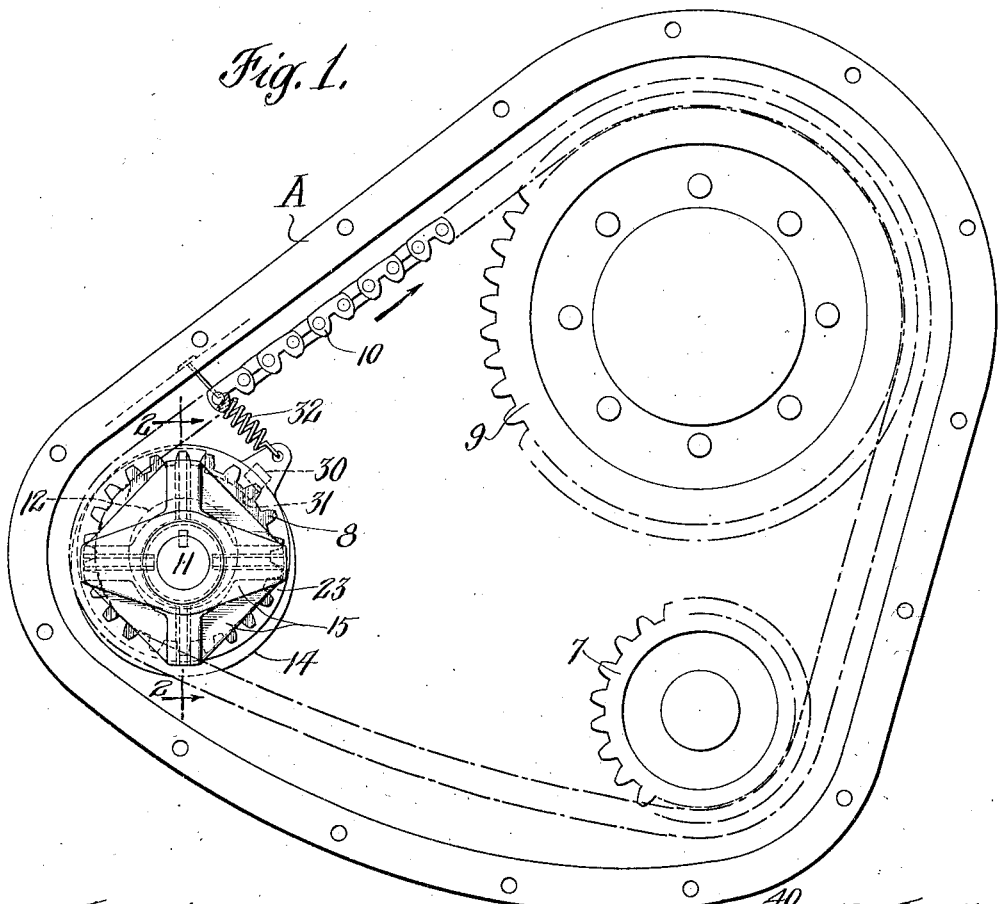
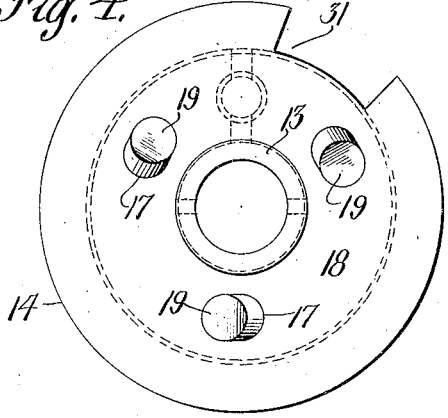
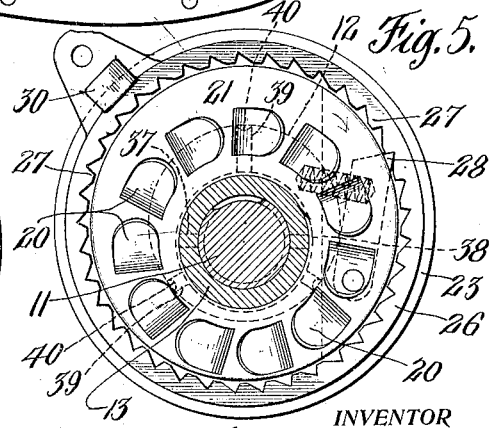
INVENTOR
Frank L. Morse
BY
Synnestvedt & Lechner
ATTORNEYS Nov. 15, 1927.

F. L. MORSE 1,648,911

CHAIN ADJUSTING DEVICE

Filed Sept. 5, 1924    2 Sheets-Sheet 2

INVENTOR
Frank L. Morse
BY
Synnestvedt & Lechner
ATTORNEYS

Patented Nov. 15, 1927.

1,648,911

UNITED STATES PATENT OFFICE.

FRANK L. MORSE, OF ITHACA, NEW YORK, ASSIGNOR TO MORSE CHAIN COMPANY, OF ITHACA, NEW YORK, A CORPORATION OF NEW YORK.

CHAIN-ADJUSTING DEVICE.

Application filed September 5, 1924. Serial No. 736,000.

This invention relates to chain adjusting devices for particular use in connection with front end drives for automobiles and will be described as applied thereto. It is however useful in connection with any chain drive in which automatic adjustment of the chain is required and in which the shaft on which it is mounted must of necessity be kept in a fixed position.

In certain instances, the shaft on which the device is mounted would be a rotatable shaft, while in other instances, as for example, when used in connection with an idler sprocket on either side of a chain it would be mounted on a stationary shaft.

Owing to the inaccessibility of the chain in front end drives for automobiles and to the lack of attention given to the chain by operators it is important to provide a device which will automatically keep the chain taut at all times, and at the same time one which is simple in construction and free from exposed parts which might be tampered with by unskilled hands.

It is therefor one of the objects of this invention to provide such a device.

Another object of this invention is to provide an improved chain adjusting device which after the chain is taut will become ineffective, and will remain so until further slack sets up.

Still another object is to provide an improved chain adjusting device in which the degree of tightness of the chain is determined by the frictional resistance between the chain sprocket and the tension adjuster.

Still another object of this invention is to provide means whereby the running parts of the device may be readily lubricated.

Still another object of the invention is to provide means whereby the device is held in position of adjustment until further adjustment takes place.

Still another object of this invention is to provide a device which will operate to take out slack by the backward rock of the engine, the chain becoming tight either after one or several backward rocks.

How these and other advantages may be realized, through my invention in a novel manner will appear from my description hereinafter of the best construction embodying the invention that is known to me.

In the drawings Fig. 1 is a face view of a typical arrangement of a front end drive for automobiles with my device shown applied thereto.

Fig. 4 is a face view of the fixed bearing of my device looking toward the left in Fig. 2.

Fig. 5 is a section taken on the line 5—5 of Fig. 2.

Figure 2:
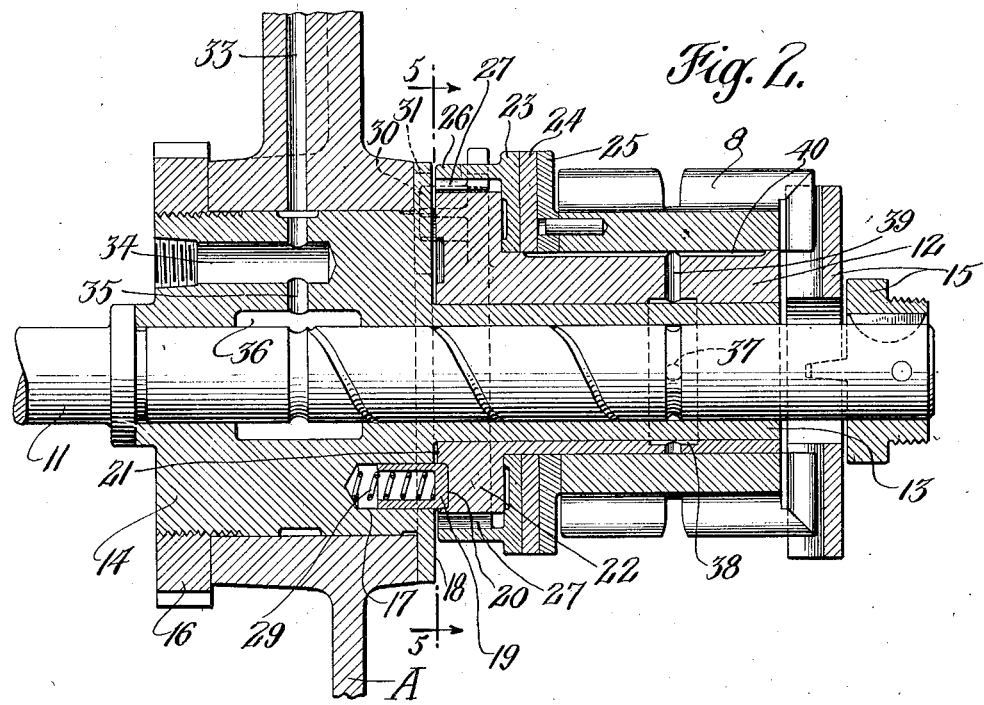
Fig. 2 is a section taken on line 2—2 of Fig. 1, with the chain omitted.
Figure 3:
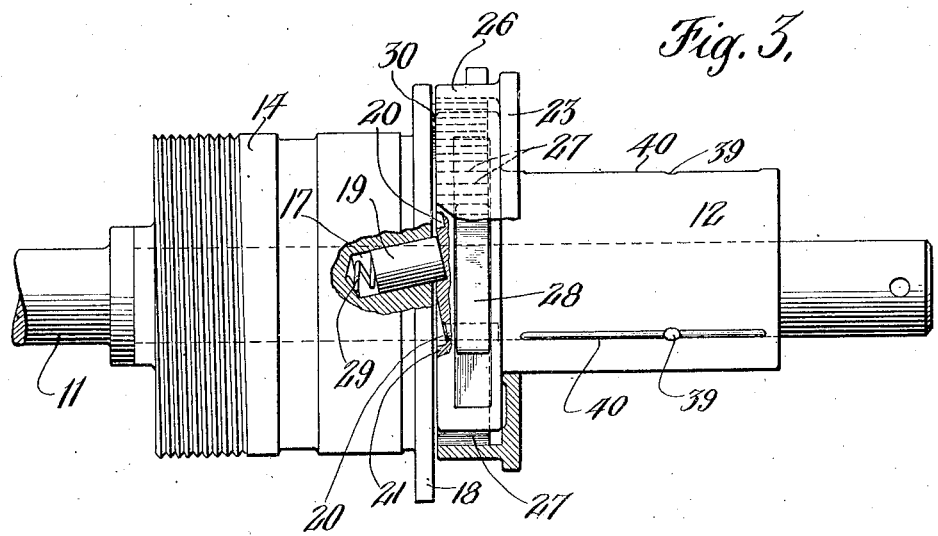
Fig. 3 is an elevation of my adjusting device with some of the parts removed and others broken away.

Referring to the drawings the reference character A indicates the gear casing for housing the front end drive, which drive in this instance consists of the crank shaft sprocket 7, the accessory shaft sprocket 8 and the cam shaft sprocket 9 connected together and driven in a clockwise direction by the chain 10. This layout constitutes the usual triangular arrangement of front end drives for automobiles.

Instead of securing the accessory shaft sprocket 8 directly to the accessory shaft 11 which is the usual form of construction, I rotatably mount the sprocket on the eccentric bushing or tension adjuster 12 which is rotatably mounted on the sleeve like extension 13 of the fixed bearing 14, driving connection between the sprocket 8 and shaft 11 being made by means of the flexible coupling 15.

The fixed bearing is securely mounted in the casing A by means of the spanner nut 16, and is provided with circumferentially spaced holes 17 in the face 18 thereof adapted to receive the spring pressed plungers 19. These holes are drilled on the bias so that the projecting end of the plunger will more readily latch into the spaced notches 20 in the face 21 of the head portion 22 of the eccentric bushing 12, the face 18 of the fixed bearing being adjacent the face 21 of the eccentric bushing when the device is assembled. The plungers 19 are spaced with relation to the spacing of the notches 20 so that as the eccentric bushing is rotated in a clockwise direction as viewed in Fig. 5, first one plunger latches into a notch then upon further rotative movement of the eccentric the next plunger latches in and so on. It will thus be seen that a very fine adjustment may be had with a relatively coarse spacing of the notches 20. The manner in which this latching arrangement functions when the adjusting device operates will be hereinafter fully described.

The eccentric portion of the bushing 12 is of such length to carry the disc-like eccentric engaging member 23, friction washer 24, disc shoe 25 and sprocket 8, all of which are mounted for rotation on said eccentric portion. The disc-like eccentric engaging member 23 is provided with a projecting rim 26 having internal ratchet teeth 27 which engage the spring latch or dog 28 carried by the eccentric bushing 12, when the member 23 is rotated in a counterclockwise direction, as viewed in Fig. 1, due to the backward rock of the engine and which ratchet past the latch 28 when the member 23 is rotated in a clockwise direction. Such motion of the member 23 is transmitted to it through the medium of the friction washer 24 and the disc shoe 25 which shoe is here shown pinned to the sprocket 8. In this instance the amount of friction tending to rotate the member 23 is determined by the springs 29 which maintain the tight frictional contact between the parts above referred to (see Fig. 2). It is to be understood however that the material of which the friction washer 24 is made may be of such nature as to maintain the desired tight frictional contact, in which case the springs 29 need be of only sufficient strength to cause the plunger to snap into the notches 20.

In order to limit the amount of movement to be transmitted to the member 23 upon backward rock of the engine and also to limit the number of teeth which are to ratchet by as the engine runs in normal direction, I have provided a lug 30 on the member 23 projecting beyond the rim 26 and into the limiting notch 31 provided in the fixed bearing 14.

When the engine is started the chain 10 runs in the direction of the arrow in Fig. 1 turning the accessory shaft sprocket in a clockwise direction and also the accessory shaft 11, through the medium of the flexible coupling 15. Rotary motion in the same direction is also imparted to the eccentric engaging member 23, through the medium of the friction washer 24, until the lug 30 thereof strikes the right hand edge of the notch 31 (see Fig. 1) during which movement one or more teeth 27, in this case two, ratchet by the spring latch or dog 28, the eccentric bushing 12 being prevented from rotating during such movement owing to the engagement of the notches 20 therein with the spring pressed plunger 19. After the lug 30 has thus engaged the notch 31 the sprocket continues to rotate on the eccentric bushing, the frictional resistance set up by the friction means being overcome by the power of the engine.

The adjusting device is now in position to act on or shift the eccentric as the engine rocks back. As is well understood in this art the engine ofttimes stops on the compression stroke which causes the backward rock hereinbefore mentioned, the rock at times being as much as a quarter revolution. I utilize this backward rock for shifting the sprocket carrying eccentric, thereby effecting the desired tightening of the chain by lengthening the distance between sprocket centers. In its reverse motion the sprocket 8 carries with it the member 23 by virtue of the friction means, which member in turn carries with it the eccentric bushing 12 by virtue of the teeth 27 thereof engaging the latch 28 as best seen in Fig. 5, the notches 20 in the eccentric bushing snapping by the plunger 19. The amount of motion of the member 23 in this direction is determined by the length of the slot 31. Obviously when the lug 30 strikes its abutment the sprocket can continue to rotate on the eccentric due to slippage between the friction members.

I propose to govern the degree of tightness of the chain by the strength of the springs 29 which determine the amount of frictional resistance. In cases where the friction disc alone is depended on the tightness will be determined by the frictional resistance of the material of which it is made.

From the foregoing it will be seen that whenever slack sets up it is automatically taken up by the backward rock of the engine thus insuring a tight chain at all times.

As shown in Fig. 1, I have provided an expansion spring 32 secured at one end to the casing A and at its other end to the member 23 which aids the friction device in rotating the member in its counterclockwise direction, although in most cases this spring may be dispensed with.

When it is desired to use my device in connection with an idler sprocket having a stub or stationary shaft the construction is the same as above pointed out except that the flexible coupling 15 is omitted, in which case the sprocket 8 runs idle on the eccentric bushing 12.

Referring now to Figs. 2 and 5 it will be seen that I have provided means for lubricating the running parts of my device, said lubricant being supplied either through the passage 33 in the casing A which leads from the usual splash region of the engine or through the passage 34 adapted to receive a grease or oil cup at its outer end. The lubricant passes through the passage 35 into the annular space 36 around the shaft 11 from whence it is carried by spiral grooves to the passages 37 into the annular groove 38 around the bearing extension 13, thence through passages 39 to the grooves 40 in the outside surface of the eccentric portion of the bushing 12, ample lubricant leaking by to the latch and plunger. Thus all of the working parts are kept well lubricated.

I claim:

1. An adjusting device for endless chains including a tension adjuster, a sprocket rotatably carried by the adjuster, means operated by the backward rock of the sprocket for moving the adjuster by steps and means for limiting the amount of adjustment to be effected by each step.

2. An adjusting device for endless chains including a tension adjuster, a sprocket rotatably carried by the adjuster, means engaging the tension adjuster for causing movement thereof, means between the sprocket and said adjuster engaging means adapted to bring the engaging means in position for moving the adjuster as the sprocket runs in its normal direction and to move the engaging means together with the adjuster as the sprocket rocks backward.

3. An adjusting device for endless chains including a tension adjuster, a sprocket rotatably carried by the adjuster, means engaging the tension adjuster for causing movement thereof, means between the sprocket and said adjuster engaging means adapted to bring the engaging means in position for moving the adjuster as the sprocket runs in its normal direction and to move the engaging means together with the adjuster as the sprocket rocks backward together with means for limiting the movement of the engaging means in either direction.

4. An adjusting device for endless chains including a tension adjuster, intermittently effective means for moving said adjuster by steps, a sprocket rotatably mounted on said adjuster, and friction means between the sprocket and the adjuster moving means for effecting the adjustment.

5. An adjusting device for endless chains including a tension adjuster, intermittently effective means for moving said adjuster by steps, a sprocket rotatably mounted on said adjuster, and friction means between the sprocket and the adjuster moving means for effecting the adjustment together with means for holding the tension adjuster in the adjusted position.

6. A front end drive for automobiles comprising in combination with two or more sprocket wheels mounted for rotation in a frame, a revoluble shaft extending through the bearing, a tension adjuster rotatably mounted on said bearing, a sprocket rotatably mounted on the tension adjuster and having flexible driving connection with the shaft, latch means carried by the tension adjuster, a member adapted to engage the latch means as the sprocket rocks back and means whereby such backward movement is transmitted to the latch engaging member.

7. A front end drive for automobiles comprising in combination with two or more sprocket wheels mounted for rotation in a frame, a fixed bearing secured to the frame, a revoluble shaft extending through the bearing, a tension adjuster rotatably mounted on said bearing, a sprocket rotatably mounted on the tension adjuster and having flexible driving connection with the shaft, latch means carried by the tension adjuster, a member adapted to engage the latch means as the sprocket rocks back and means whereby such backward movement is transmitted to the latch engaging member, together with means for limiting the movement of the latch engaging member.

8. A front end drive for automobiles comprising in combination with two or more sprocket wheels mounted for rotation in a frame, a fixed bearing secured to the frame, a revoluble shaft extending through the bearing, a tension adjuster rotatably mounted on said bearing, a sprocket rotatably mounted on the tension adjuster and having flexible driving connection with the shaft, latch means carried by the tension adjuster, a member adapted to engage the latch means as the sprocket rocks back and means whereby such backward movement is transmitted to the latch engaging member, together with means for holding the tension adjuster in adjusted position.

9. A front end drive for automobiles comprising in combination with two or more sprocket wheels mounted for rotation in a frame, a fixed bearing secured to the frame, a revoluble shaft extending through the bearing, a tension adjuster rotatably mounted on said bearing, a sprocket rotatably mounted on the tension adjuster and having flexible driving connection with the shaft, latch means carried by the tension adjuster, a member adapted to engage the latch means as the sprocket rocks back and means whereby such backward movement is transmitted to the latch engaging member, together with a series of passages for lubricating the working parts.

10. A front end drive for automobiles comprising in combination with two or more sprocket wheels mounted for rotation in a frame, a fixed bearing secured to the frame, a revoluble shaft extending through the bearing, a tension adjuster rotatably mounted on said bearing, a sprocket rotatably mounted on the tension adjuster and having flexible driving connection with the shaft, latch means carried by the tension adjuster, a member adapted to engage the latch means as the sprocket rocks back, and means whereby such backward movement is transmitted to the latch engaging member said means becoming ineffective when the chain is taut.

11. An adjusting device for endless chains including a tension adjuster, a sprocket rotatably carried by the adjuster, a latch carried by the adjuster, and a friction device including means for engaging the latch, said friction device operating to move the tension adjuster as the sprocket rocks back in a direction opposite the normal run thereof.

12. An adjusting device for endless chains including an eccentric bushing, a sprocket on said bushing, friction means associated with the sprocket and eccentric for adjusting the position of the eccentric on backward rock of the sprocket and yielding means for holding the eccentric in position of adjustment and functioning to maintain the friction drive of the friction means between the sprocket and the eccentric bushing.

13. An adjusting device for endless chains including an eccentric bushing, a sprocket on said bushing, a disc shoe carried by the sprocket, a disc like eccentric engaging member and a washer of friction material between the disc shoe and eccentric engaging member for operating said member to adjust the position of the eccentric on backward rock of the eccentric.

In testimony whereof, I have hereunto signed my name.

FRANK L. MORSE.